May 31, 1949.  L. M. McFADDEN  2,471,640
ELECTRIC INSECT AND RODENT TRAP
Filed Jan. 7, 1946  2 Sheets-Sheet 1
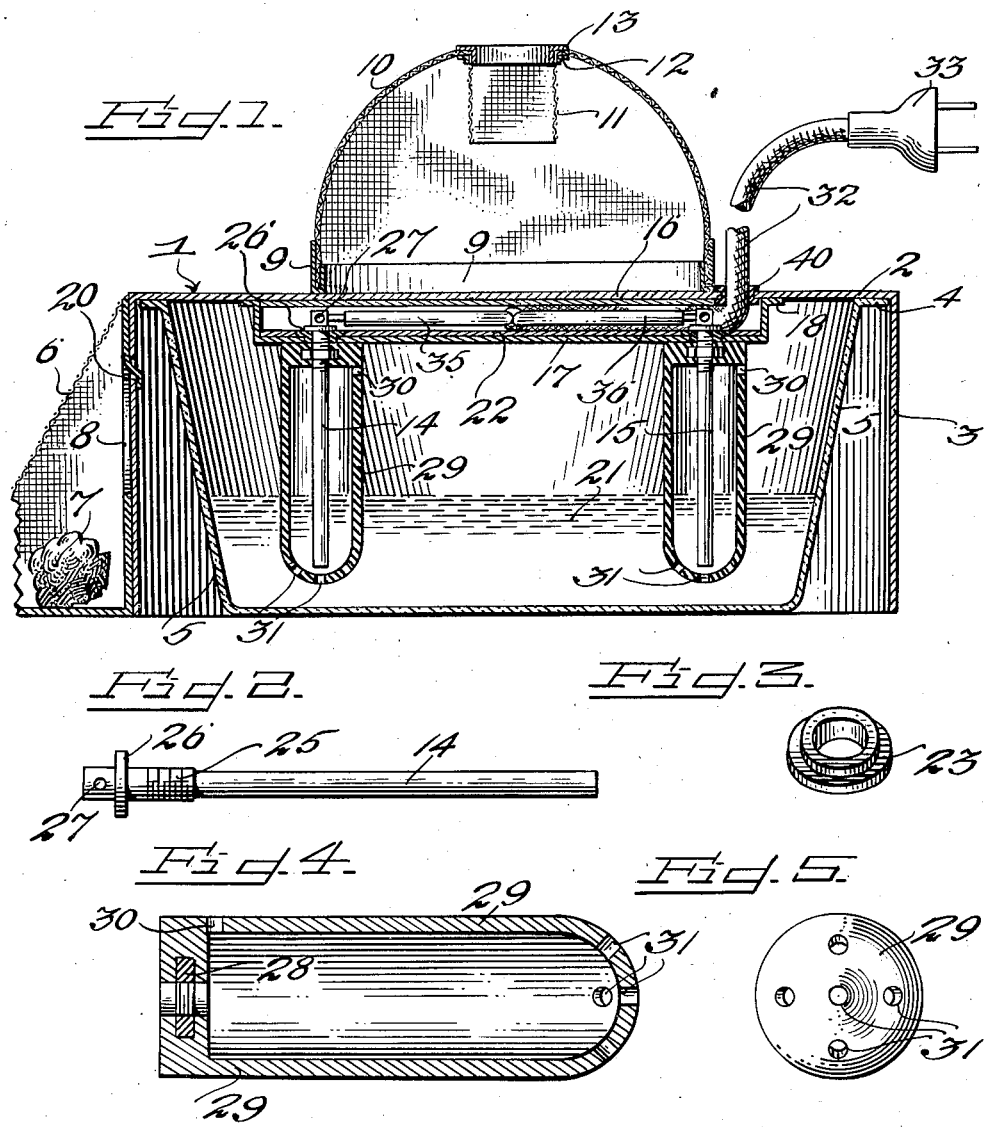
Inventor
Leo M. McFadden
By Clarence A. O'Brien
and Harvey B. Jacobson
Attorneys

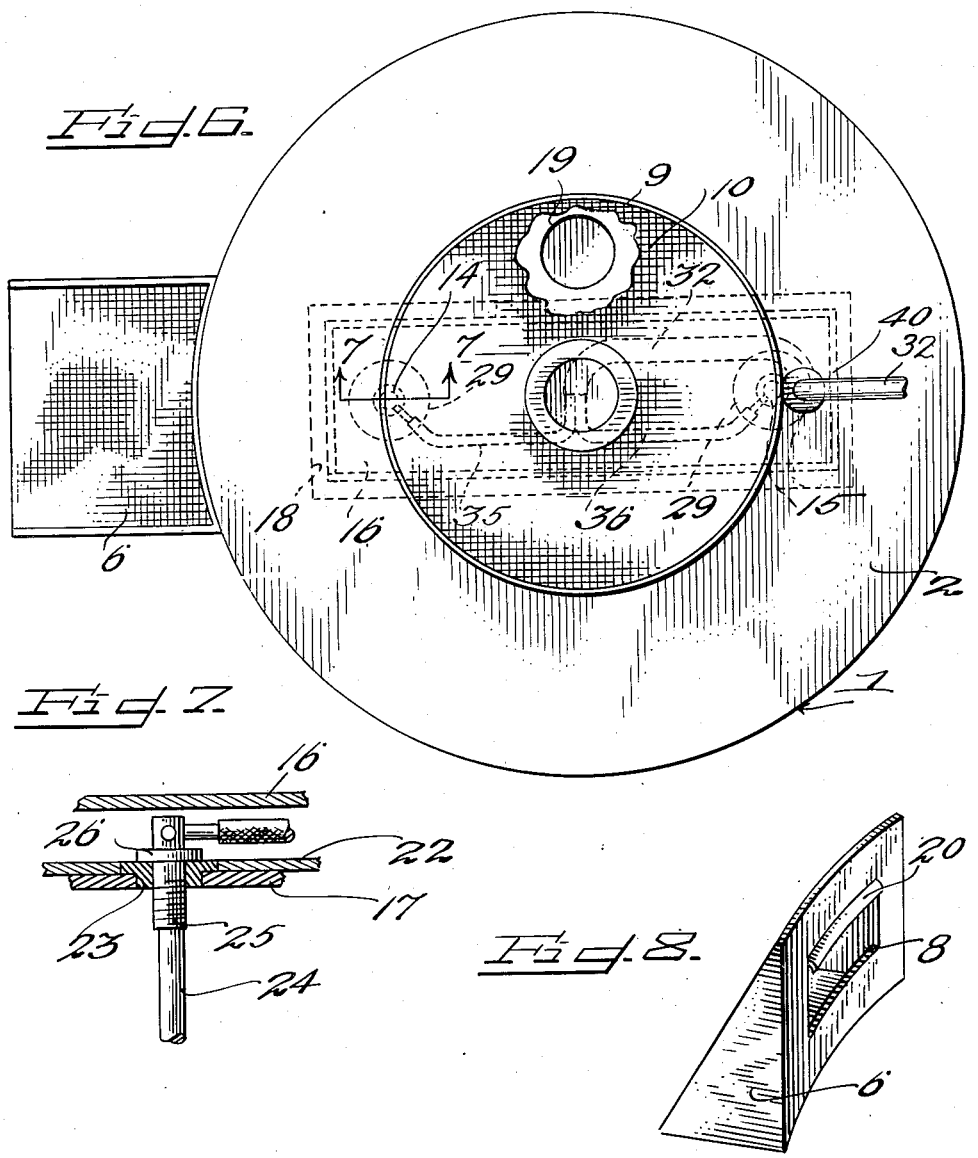

Patented May 31, 1949

2,471,640

UNITED STATES PATENT OFFICE 2,471,640

ELECTRIC INSECT AND RODENT TRAP

Leo M. McFadden, Denver, Colo., assignor to Roy Wilbur McKee, Jr., Lodi, Calif.

Application January 7, 1946, Serial No. 639,492

2 Claims. (Cl. 43—98)

1

This invention relates to improvements in electric insect and rodent traps.

An object of the invention is to provide an improved insect and rodent trap which will electrocute insects and rodents when they are caught in the trap.

Another object of the invention is to provide an improved electrocuting insect and rodent trap which will be harmless for a person to handle, but will instantly electrocute an insect or rodent when caught in the trap.

A further object of the invention is to provide an improved electrically operated insect and rodent trap which will be highly efficient in operation, and which will be relatively inexpensive to manufacture and produce.

Other objects will appear as the description proceeds.

In the accompanying drawings which form part of this application,

Figure 1 is a transverse sectional view through the improved insect and rodent trap;

Figure 2 is a side elevation of an electrode used in the trap;

Figure 3 is a perspective view of an insulating bushing used about an electrode;

Figure 4 is a longitudinal sectional view through an insulated electrode guard member;

Figure 5 is a bottom plan view of the electrode guard member;

Figure 6 is a top plan view of the insect and rodent trap;

Figure 7 is a detail sectional view taken on the line 7—7 of Figure 6, and

Figure 8 is a perspective view of the lure bait holder.

Like characters of reference are used throughout the following specification and the accompanying drawings to designate corresponding parts.

In carrying out the invention, there is provided a trap housing, cover, or body 1 preferably circular in form and having a flat upper surface 2, and a depending circular supporting side 3. The body 1 is adapted to fit over and contact the upper peripheral flange 4 formed about the upper edge of the fluid containing pan or container 5, formed of porcelain or glass, or of any suitable material which will not conduct electricity.

A lure bait holder 6 will be formed of wire mesh, and will be clipped to the side of the depending side 3 of the body 1 by the clip 20, to hold the lure bait 7. Of course, an opening 8 will be formed in the holder 6 through which the bait may be placed in the said holder.

2

An upstanding channeled collar 9 will be formed on and supported centrally on the top 2 of the trap body 1, and will removably support the dome-shaped wire screen cage 10, which will have a depending wire screen guide sleeve 11 of reduced size supported through a central opening in the apex of said cage 10. The sleeve 11 will preferably be formed integrally with the cage 10, and have the co-acting flanged reinforcing collars 12 and 13 about the junction of the cage and sleeve. A piece of bait (not shown) is placed on the flat upper surface 2 within the cage 10 for a purpose to be later described.

A substantially rectangular shaped housing for supporting the spaced electrodes 14 and 15 will comprise spaced longitudinally extending walls 16 and 17, said lower wall 17 being formed with an annular flange 18, which is secured to the under surface of the top 2, in any desired manner. An opening 19 will be formed through the top 2 to permit insects or rodents to pass therethrough after they enter the guide sleeve 11 and drop onto the upper surface of the top 2 within the cage 10, and in dropping through the opening 19, they will drop into the fluid 21 in the fluid containing pan or container 5, where they will be instantly electrocuted.

An insulating disk 22 will be placed on the surface of the wall 17, and insulating bushings 23 will be positioned to extend through apertures formed through the said disk and wall.

A pair of electrodes 14 and 15 will be threaded adjacent their upper ends as at 25, and will be formed with the annular or positioning flanges 26, and transverse openings 27 to receive the electric cable from a source of electric supply (not shown). The electrodes 14 and 15 will be inserted through the apertures and bushings 23, their downward movement being limited by the annular flanges 26, and will thread into the threaded nuts 28 cast in the tubular ceramic or plastic insulating guards 29, which are closed at their lower end and formed with vent holes 30 adjacent their upper ends, and with the series of openings 31 in their lower rounded ends to permit the fluid in the pan 5 to reach the electrodes 14 and 15 to complete an electric circuit through the fluid to immediately electrocute the insects or rodents as they fall into the fluid.

A dual electric conduit 32 having a plug 33 on its outer end adapted to be placed in a suitable floor plug or electric current outlet (not shown) is provided, and extends through a grommet 40 and is split to provide the leads or terminals 35 and 36 which are bored and extend through the openings 27 in the electrodes 14 and 15, where they are soldered to insure good electric connections to the electrodes.

From the foregoing description, the mode of operation of the improved electric insect and rodent trap will be readily understood. The lure bait in the bait holder 6 is never reached by the insects or rodents, but is only intended to lure them to the bait in the cage 10, which they will enter and drop through the opening 19 into the fluid 21. The trap will be connected at all times with a source of electric current, and enough fluid will be placed in the fluid container 5 to reach or extend well up on the electrodes 14 and 15, so that any insect or rodent falling into the fluid will be immediately electrocuted. Of course, the pan 5 will be emptied at frequent intervals to dispose of the dead insects and rodents.

While the preferred embodiment of the invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. An insect and rodent trap including an insulated water container and a cover adapted to be disposed over the same and to extend to the bottom thereof, a bait container on the side wall of said cover, an annular collar formed by concentrically arranged upstanding flanges on the top of said cover, a dome shaped wire screen cage detachably supported by said collar between said flanges and formed with a central opening, a depending cylindrical screen guide supported in said central opening, said cover having an opening formed through it out of vertical alignment with said screen guide, a housing formed with spaced upper and lower walls secured to the under surface of said cover, an insulating disk supported upon the upper surface of said lower wall, depending spaced electrodes having positioning flanges formed about their upper ends seating on said insulating disk and extending therethrough and into the water when placed in said insulated water container, and means for connecting said electrodes with any desired electric current supply outlet.

2. An insect and rodent trap including an insulated water container and a cover adapted to be disposed over the same and to extend to the bottom thereof, a bait container on the side wall of said cover, an annular collar formed by concentrically arranged upstanding flanges on the top of said cover, a dome shaped wire screen cage supported by said collar between said flanges and formed with a central opening, a depending cylindrical screen guide supported in said central opening, said cover having an opening formed through it out of vertical alignment with said screen guide, a housing formed with spaced upper and lower walls secured to the under surface of said cover, an insulating disk supported upon the upper surface of said lower wall, depending spaced electrodes having positioning flanges formed about their upper ends seating upon said insulating disk and extending into the water when placed in said insulated water container, said electrodes being externally threaded immediately below said positioning flanges, tubular insulating guards having closed ends formed with vents adjacent their opposite ends and central apertures formed through their upper ends, and threaded nuts embedded in the upper ends of said insulating guards about said central apertures adapted to thread upon said threaded electrodes for holding the insulated guards in concentric position about the same whereby the operator of the trap will be positively safeguarded against electric shock when handling the trap.

LEO M. McFADDEN.

REFERENCES CITED

The following references are of record in the file of this patent:

UNITED STATES PATENTS

| Number | Name | Date |
|---|---|---|
| 1,024,967 | Balint | Apr. 30, 1912 |
| 1,045,584 | Mock | Nov. 26, 1912 |
| 1,660,013 | Morawiecki | Feb. 21, 1928 |
| 2,218,403 | McKee | Oct. 15, 1940 |